United States Patent
Maeda et al.

(10) Patent No.: US 8,976,642 B2
(45) Date of Patent: Mar. 10, 2015

(54) DECODING DEVICE, DECODING METHOD, AND PROGRAM

(75) Inventors: Yuuji Maeda, Tokyo (JP); Jun Matsumoto, Kanagawa (JP); Yasuhiro Toguri, Kanagawa (JP); Shiro Suzuki, Kanagawa (JP); Yuuki Matsumura, Saitama (JP)

(73) Assignee: Sony Corporation, Tokyo (JP)

( * ) Notice: Subject to any disclaimer, the term of this patent is extended or adjusted under 35 U.S.C. 154(b) by 410 days.

(21) Appl. No.: 13/191,216

(22) Filed: Jul. 26, 2011

(65) Prior Publication Data
US 2012/0026861 A1  Feb. 2, 2012

(30) Foreign Application Priority Data

Aug. 2, 2010 (JP) ................. P2010-173943

(51) Int. Cl.
*H04J 11/00* (2006.01)
*H04L 27/26* (2006.01)

(52) U.S. Cl.
CPC ........ *H04L 27/2649* (2013.01); *H04L 27/2639* (2013.01)
USPC ........................................... 370/208

(58) Field of Classification Search
USPC ............................... 370/208, 522
See application file for complete search history.

(56) References Cited

U.S. PATENT DOCUMENTS

| | | | | |
|---|---|---|---|---|
| 5,608,713 | A * | 3/1997 | Akagiri et al. | 369/124.08 |
| 6,226,325 | B1 * | 5/2001 | Nakamura | 375/240 |
| 7,783,496 | B2 * | 8/2010 | Tsushima et al. | 704/500 |
| 7,805,477 | B2 * | 9/2010 | Oh et al. | 708/402 |
| 7,895,035 | B2 * | 2/2011 | Ehara | 704/219 |
| 8,463,599 | B2 * | 6/2013 | Ramabadran et al. | 704/205 |
| 2002/0181551 | A1 * | 12/2002 | Lee et al. | 375/146 |
| 2011/0135038 | A1 * | 6/2011 | LeBlanc et al. | 375/316 |

FOREIGN PATENT DOCUMENTS

JP   2008-258992   10/2008

* cited by examiner

*Primary Examiner* — Hassan Kizou
*Assistant Examiner* — Abdullahi Ahmed
(74) *Attorney, Agent, or Firm* — Finnegan, Henderson, Farabow, Garrett & Dunner, L.L.P.

(57) ABSTRACT

A decoding device includes an acquisition unit configured to acquire a first frequency signal including a narrowband signal and a wideband signal, a direct inverse orthogonal transform unit configured to perform a direct matrix operation with respect to the narrowband signal of the first frequency signal so as to perform inverse orthogonal transform, and a high-speed inverse orthogonal transform unit configured to perform inverse orthogonal transform employing a high-speed operation method with respect to the wideband signal of the first frequency signal.

11 Claims, 10 Drawing Sheets

FIG. 2

| HEADER | F-L, R | CENTER | LFE FLAG | LFE | R-L, R |

FIG. 3

| NUMBER OF TIMES OF MULTIPLICATION | NUMBER OF TIMES OF ADDITION | NUMBER OF TIMES OF READING | NUMBER OF TIMES OF EVACUATION |
|---|---|---|---|
| $N(\log_2 N + 1)$ | $N(3\log_2 N - 1)/2$ | $N\log_2 N$ | $N\log_2 N$ |

FIG. 4

| NUMBER OF TIMES OF MULTIPLICATION | NUMBER OF TIMES OF ADDITION | NUMBER OF TIMES OF READING | NUMBER OF TIMES OF EVACUATION |
|---|---|---|---|
| $N \times M$ | $N \times M$ | $N \times M$ | $N$ |

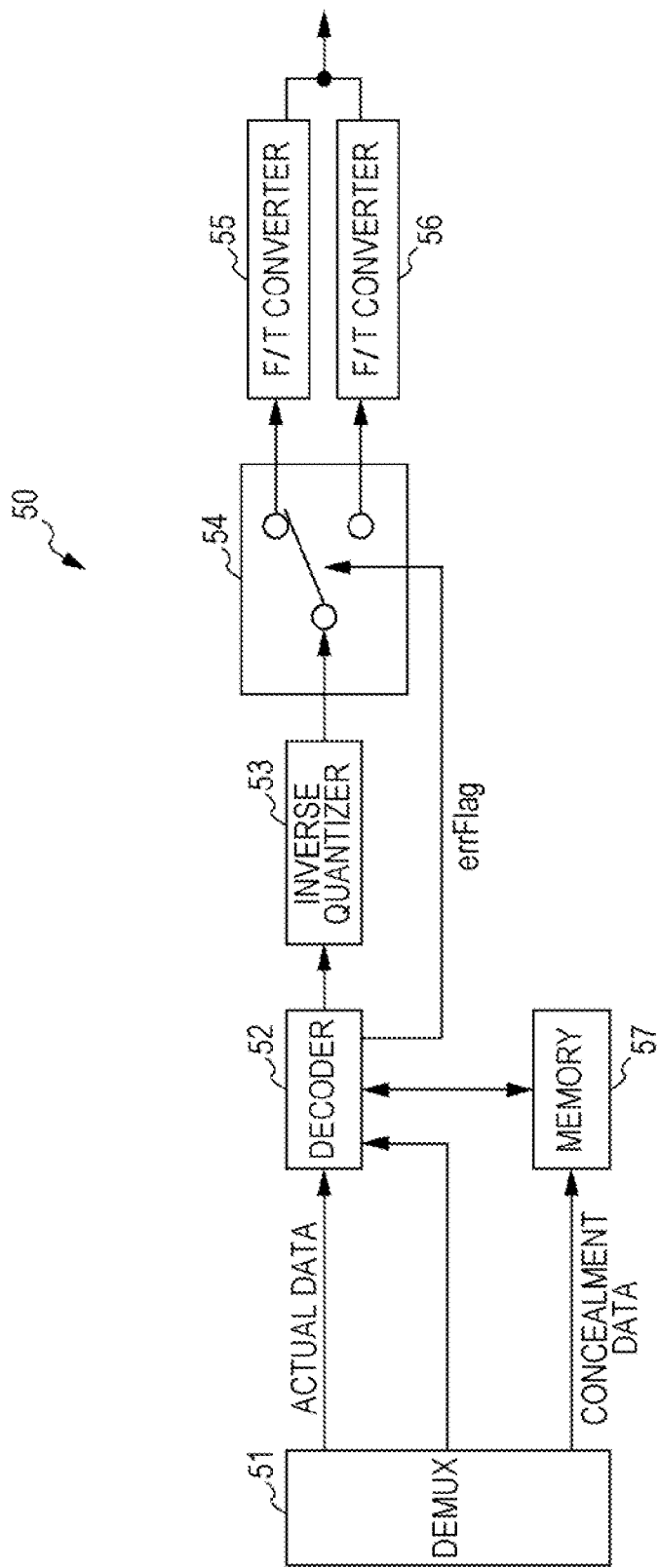

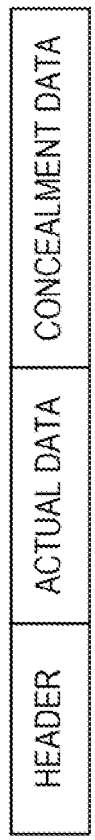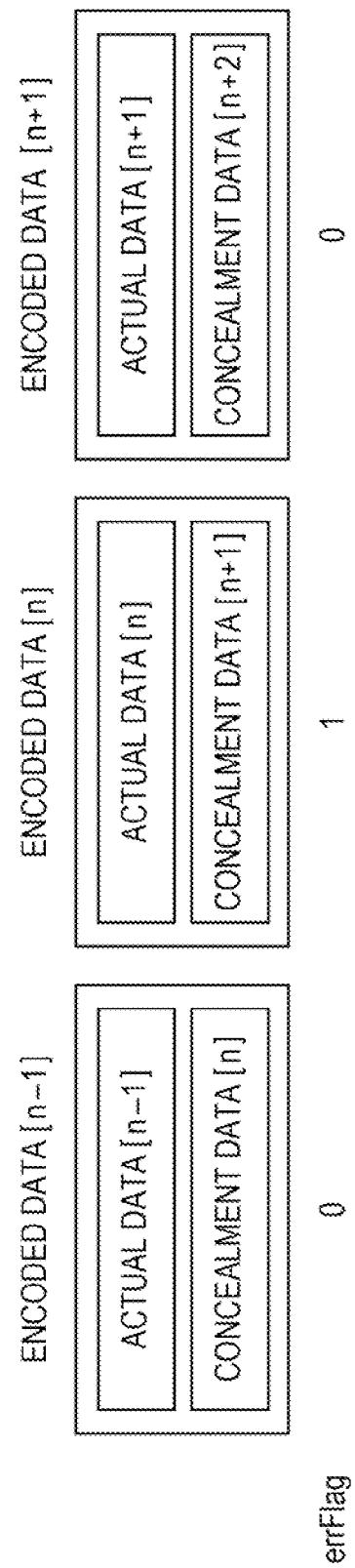

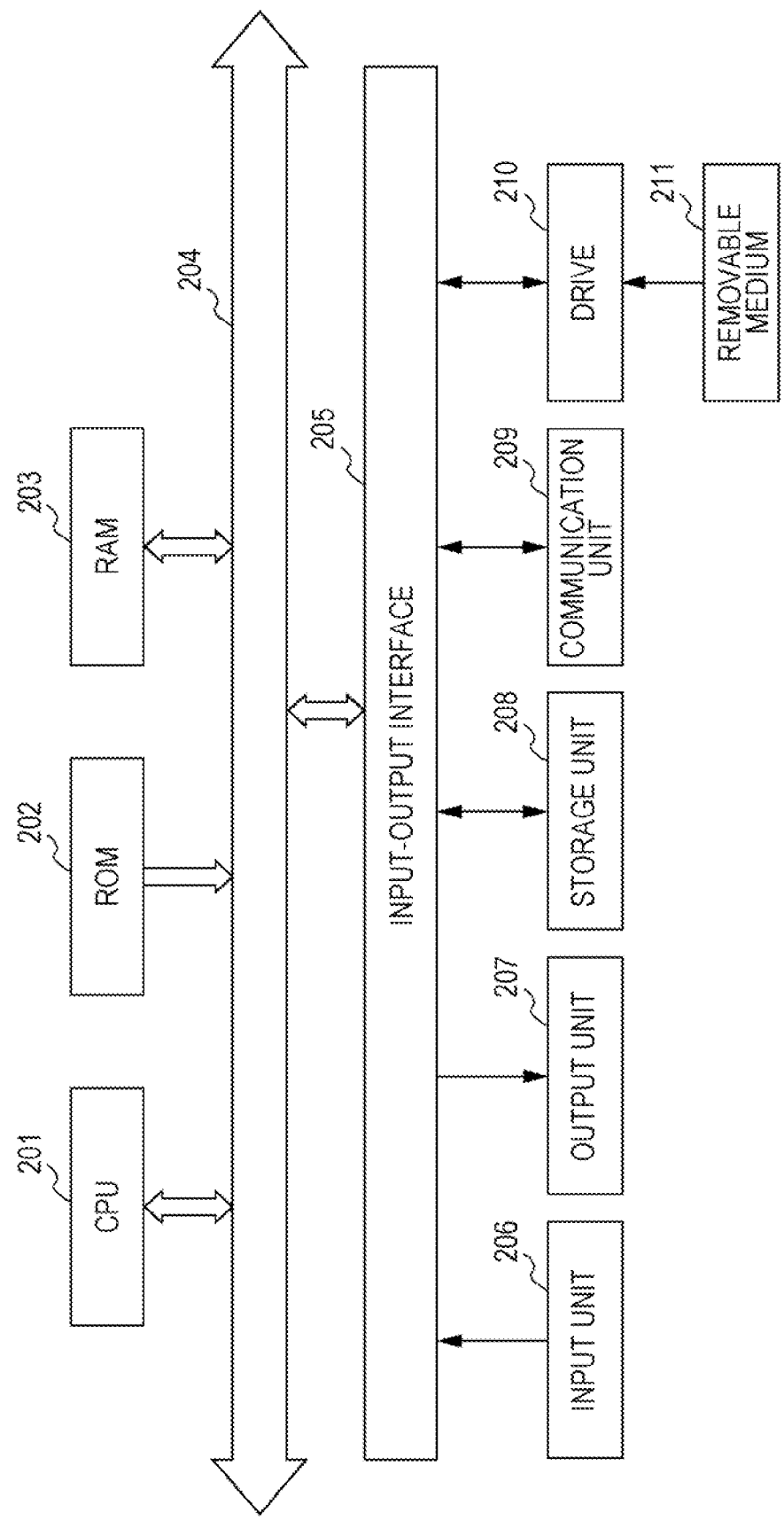

DECODING DEVICE, DECODING METHOD, AND PROGRAM

BACKGROUND

The present technology relates to a decoding device, a decoding method, and a program. Especially, the present technology relates to a decoding device, a decoding method, and a program that can reduce an operation amount in inverse orthogonal transform with respect to a frequency signal including a narrowband signal and a wideband signal.

In the related art, there is an encoding device that transforms a time signal of a sound or the like into a frequency signal and quantizes the frequency signal so as to encode and transmit the signal. Further, there is a decoding device that decodes encoded data which is transmitted by such encoding device and inversely quantizes the data so as to transform the resulting frequency signal into a time signal.

In such decoding device, inverse orthogonal transforms such as inverse fast Fourier transform (IFFT), inverse discrete cosine transform (IDCT), and inverse modified discrete cosine transform (IMDCT) are often used as the transform of a frequency signal into a time signal (referred to below as frequency-time transform).

On the other hand, there is a radio communication device that is provided with a fast Fourier transform (FFT) having a predetermined demodulation property and an FFT which has an inferior demodulation property but exhibits low power consumption and that switches and uses these FFTs so as to suppress power consumption (For example, Japanese Unexamined Patent Application Publication No. 2008-258992).

SUMMARY

In inverse orthogonal transform which is used in the frequency-time transform described above, a matrix operation using spectra of respective divided bands constituting a frequency signal, as elements is performed commonly by fast algorithm (fast operation method). Accordingly, when the frequency signal is a wideband signal, an operation amount can be reduced compared to when a direct matrix operation is performed.

However, when the frequency signal is a narrowband signal, a signal of a divided band which is larger than or equal to a predetermined band becomes a zero signal. Therefore, a redundant operation is performed, and thus the operation amount is increased compared to a case where a direct matrix operation is performed.

It is desirable to enable reduction of an operation amount in inverse orthogonal transform with respect to a frequency signal which includes a narrowband signal and a wideband signal.

According to an embodiment of the present technology, there is provided a decoding device that includes an acquisition unit configured to acquire a first frequency signal including a narrowband signal and a wideband signal, a direct inverse orthogonal transform unit configured to perform a direct matrix operation with respect to the narrowband signal of the first frequency signal so as to perform inverse orthogonal transform, and a high-speed inverse orthogonal transform unit configured to perform inverse orthogonal transform employing a high-speed operation method with respect to the wideband signal of the first frequency signal.

A decoding method and a program according to embodiments of the present technology correspond to the decoding device of the above-described embodiment.

According to the embodiments, a first frequency signal including a narrowband signal and a wideband signal is acquired, a direct matrix operation is performed with respect to the narrowband signal of the first frequency signal so as to perform inverse orthogonal transform, and inverse orthogonal transform employing a high-speed operation method is performed with respect to the wideband signal of the first frequency signal.

The decoding device according to the embodiment may be an independent device or an internal block constituting one device.

According to the embodiments of the present technology, an operation amount in inverse orthogonal transform with respect to a frequency signal including a narrowband signal and a wideband signal can be reduced.

BRIEF DESCRIPTION OF THE DRAWINGS

FIG. 2 illustrates a configuration example of encoded data transmitted to the decoding device of FIG. 1;

FIG. 3 illustrates an operation amount in DCT-IV in high-speed IMDCT performed by an F/T converter in FIG. 1;

FIG. 4 illustrates an operation amount in DCT-IV in direct IMDCT performed by an FIT converter in FIG. 1;

FIG. 10 is a block diagram showing a configuration example of a decoding device according to still another embodiment of the present technology;

FIG. 11 illustrates a configuration example of encoded data transmitted to the decoding device of FIG. 10;

FIG. 12 illustrates a using method of concealment data;

FIG. 14 illustrates a configuration example of an embodiment of a computer.

DETAILED DESCRIPTION OF EMBODIMENTS

Embodiment

[Configuration Example of Decoding Device According to an Embodiment]

Figure 1:
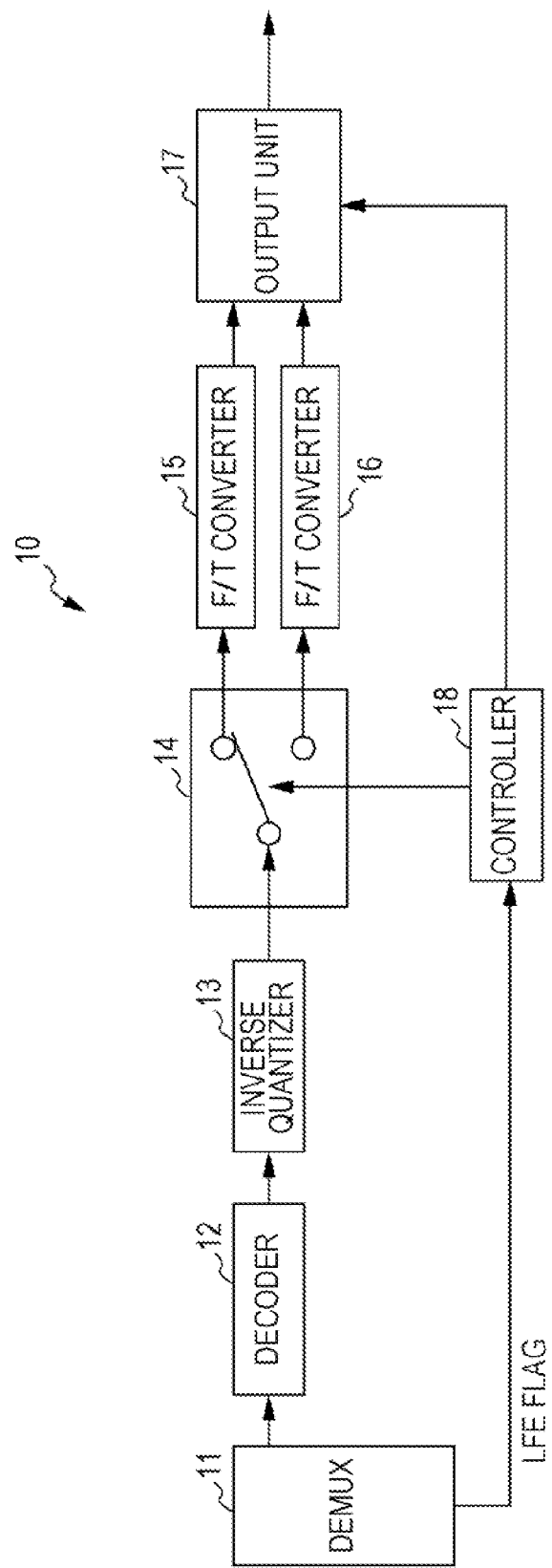
FIG. 1 is a block diagram showing a configuration example of a decoding device according to an embodiment of the present technology.

FIG. 1 is a block diagram showing a configuration example of a decoding device according to an embodiment of the present technology.

A decoding device 10 of FIG. 1 includes a DEMUX 11, a decoder 12, an inverse quantizer 13, a switch 14, an F/T converter 15, an F/T converter 16, an output unit 17, and a controller 18. The decoding device 10 decodes encoded data transmitted from an encoding device which is not shown. This encoded data is obtained by transforming a low frequency effect (LFE) signal such as a subwoofer signal serving as a narrowband signal and a common audio signal serving as a wideband signal into frequency signals from time signals, and quantizing, encoding, and multiplexing the frequency signals.

The DEMUX 11 (acquisition unit) of the decoding device 10 acquires the encoded data and inversely multiplexes the encoded data. Thus, the DEMUX 11 extracts the frequency signal of the LFE signal which is quantized and encoded, the frequency signal of the common audio signal which is quantized and encoded, and the like so as to supply the frequency signals to the decoder 12. Further, the DEMUX 11 extracts a LFE flag which expresses whether an encoding result of the LFE signal is included in the encoded data and supplies the LFE flag to the controller 18 and the output unit 17.

The decoder 12 decodes the frequency signal of the LFE signal which is quantized and encoded and is supplied from the DEMUX 11 and supplies the resulting frequency signal of the LFE signal which is quantized to the inverse quantizer 13. Further, the decoder 12 decodes the frequency signal of the common audio signal which is quantized and encoded and is supplied from the DEMUX 11 and supplies the resulting frequency signal of the common audio signal which is quantized to the inverse quantizer 13.

The inverse quantizer 13 inversely quantizes the frequency signal of the LFE signal which is quantized and is supplied from the decoder 12 and supplies the resulting frequency signal of the LFE signal to the switch 14. Further, the inverse quantizer 13 inversely quantizes the frequency signal of the common audio signal which is quantized and is supplied from the decoder 12 and supplies the resulting frequency signal of the common audio signal to the switch 14.

The switch 14 (selecting unit) selects the frequency signal of the common audio signal among the frequency signals which are supplied from the inverse quantizer 13, based on an instruction supplied from the controller 18 and supplies the frequency signal of the common audio signal to the FIT converter 15. Further, the switch 14 selects the frequency signal of the LFE signal among the frequency signals which are supplied from the inverse quantizer 13, based on an instruction supplied from the controller 18 and supplies the frequency signal of the LFE signal to the FIT converter 16.

The F/T converter 15 (high-speed inverse orthogonal transform unit) performs high-speed IMDCT with respect to the frequency signal of the common audio signal supplied from the switch 14 so as to obtain the common audio signal which is a time signal and supply the common audio signal to the output unit 17. Here, the high-speed IMDCT represents transform employing a high-speed operation method in DCT-IV in IMDCT.

The F/T converter 16 (direct inverse orthogonal transform unit) performs direct IMDCT with respect to the frequency signal of the LFE signal supplied from the switch 14 so as to obtain the LFE signal which is a time signal and supply the LFE signal to the output unit 17. Here, the direct IMDCT represents transform in which a direct matrix operation is performed without using the high-speed operation method in DCT-IV in IMDCT. There is no significant difference between transforming capability of the high-speed IMDCT and transforming capability of the direct IMDCT.

The output unit 17 (output unit) generates a zero signal and outputs the zero signal as the LFE signal, or outputs the LFE signal supplied from the F/T converter 16 depending on a control of the controller 18. Further, the output unit 17 outputs the common audio signal supplied from the F/T converter 15.

The controller 18 instructs the switch 14 to select either the F/T converter 15 or the F/T converter 16 based on a decoding object. Further, the controller 18 controls an output of the output unit 17 based on the LFE flag supplied from the DEMUX 11.

[Configuration Example of Decoded Data]

FIG. 2 illustrates a configuration example of the encoded data transmitted to the decoding device 10 of FIG. 1.

As shown in FIG. 2, a header, front LR (F-L,R), CENTER, LFE flag, LFE, and rear LR (R-L,R) are arranged from the head in this order in the encoded data.

The front LR is encoding results of common audio signals of two channels for the front right and the front left, and the encoding results of the two channels are arranged as one audio block. The CENTER is an encoding result of a common audio signal of one channel for the center, and the encoding result of the one channel is arranged as one audio block.

The LFE flag becomes 1 when LFE is included in the encoded data and becomes 0 when the LFE is not included. The LFE is an encoding result of a LFE signal, and the encoding result is arranged as an audio block depending on necessity. The rear LR is encoding results of common audio signals of two channels for the rear right and the rear left, and the encoding results of the two channels are arranged as one audio block.

Here, a block ID, which is different for every kind of signals constituting the audio block, is added to each of the audio blocks. Namely, different block IDs are added to respective audio blocks of the front LR, the CENTER, the LFE, and the rear LR respectively. In this example, block IDs "1", "2", "3", and "4" are respectively added to the audio blocks of the front LR, the CENTER, the LFE, and the rear LR.

[Description of Operation Amount in High-Speed IMDCT and Direct IMDCT]

FIG. 3 illustrates an operation amount in DCT-IV in the high-speed IMDCT performed by the F/T converter 15 of FIG. 1, and FIG. 4 illustrates an operation amount in DCT-IV in the direct IMDCT performed by the F/T converter 16 of FIG. 1.

DCT-IV in IMDCT is first described.

IMDCT indicates transform which is performed while duplicating blocks by making the number of taps twice as large as the division number, and can reduce distortion between the blocks. In DCT-IV in IMDCT, multiplication is performed with respect to the frequency signal which is an input signal, as shown in the following Formula 1.

$$\begin{bmatrix} y_1 \\ y_2 \\ \vdots \\ y_N \end{bmatrix} = [C_N^4] \cdot \begin{bmatrix} X_1 \\ X_2 \\ \vdots \\ X_N \end{bmatrix} \quad (1)$$

In Formula 1, N denotes the number of band divisions of the frequency signal which is an input signal, and $X_N$ denotes a spectrum of the n-th division band. $C_N^4$ denotes a transform matrix of DCT-IV, and $y_N$ denotes a signal of the spectrum of the n-th division band after transform.

In the high-speed IMDCT with respect to the common audio signal by the F/T converter 15, a high-speed operation method is employed as an operation method of such DCT-IV. Several methods are proposed as the high-speed operation method, including Wang algorithm as one of the methods. The Wang algorithm realizes speed-up of the operation by decomposing a DCT matrix into a sparse matrix which includes large number of zero elements. FIG. 3 shows the operation amount of DCT-IV when the Wang algorithm is employed.

Specifically, as shown in FIG. 3, the number of times of multiplication DCT-IV is $N(\log_2 N+1)$, and the number of times of addition is $N(3 \log_2 N-1)/2$. The number of times of reading which is the number of reading out a spectrum $X_N$ from a built-in memory which is not shown is $N \log_2 N$, and the number of times of evacuation which is the number of evacuating an intermediate result to the built-in memory which is not shown is $N \log_2 N$.

Accordingly, when N is 256($\log_2 N$=8), for example, the number of times of multiplication becomes 2304, the number of times of addition becomes 244, and the number of times of reading and the number of times of evacuation become 2048.

On the other hand, the LFE signal is commonly a signal having an ultralow frequency about 0 Hz to 120 Hz. Accordingly, as shown in the following Formula 2, the number of spectra $X_N$ in a valid band, that is, the number of valid division bands becomes M (M<N), and the spectra $X_N$ in other division bands of M−N pieces becomes 0.

$$X=[X_1, X_2, \ldots X_M, 0, \ldots, 0]^T \quad (2)$$

For example, when the frequency of the common audio signal is 48 kHz, an available band of the common audio signal is 24 kHz. Therefore, if the number of band divisions is 256, the number of spectra of the LFE signal of 120 Hz becomes 1.28 (=120×256/24000), and thus M has a value sufficiently smaller than the value of N.

In the direct IMDCT with respect to the LFE signal performed by the F/T converter 16, the high-speed operation method is not employed as the operation method of DCT-IV, but the direct matrix operation is performed by employing the following Formula 3.

$$\begin{bmatrix} y_1 \\ y_2 \\ \vdots \\ \vdots \\ \vdots \\ y_{N-1} \\ y_N \end{bmatrix} = \begin{bmatrix} C_{11} & C_{12} & \ldots & C_{1M} & \ldots & C_{1(N-1)} & C_{1N} \\ C_{21} & C_{22} & \ldots & C_{2M} & \ldots & C_{2(N-1)} & C_{2N} \\ \vdots & \vdots & \ldots & \vdots & \ldots & \vdots & \vdots \\ \vdots & \vdots & \ldots & \vdots & \ldots & \vdots & \vdots \\ \vdots & \vdots & \ldots & \vdots & \ldots & \vdots & \vdots \\ C_{(N-1)1} & C_{(N-1)2} & \ldots & C_{(N-1)M} & \ldots & C_{(N-1)(N-1)} & C_{(N-1)N} \\ C_{N1} & C_{N2} & \ldots & C_{NM} & \ldots & C_{N(N-1)} & C_{NN} \end{bmatrix} \begin{bmatrix} X_1 \\ X_2 \\ \vdots \\ X_M \\ 0 \\ \vdots \\ 0 \end{bmatrix} \quad (3)$$

In Formula 3, $C_{11}$ to $C_{NN}$ denote respective elements of a transform matrix $C_N^4$, that is, transform coefficients.

According to Formula 3, spectra $X_{M+1}$ to $X_N$ which are the M+1th and later division bands are all 0, so that no operation has to be performed with respect to the spectra $X_{M+1}$ to $X_N$. Accordingly, the operation amount in DCT-IV in the direct IMDCT with respect to the LFE signal becomes as shown in FIG. 4.

Specifically, as shown in FIG. 4, the numbers of times of multiplication, addition, and reading in DCT-IV are N×M, and the number of times of evacuation is N.

Figure 5:
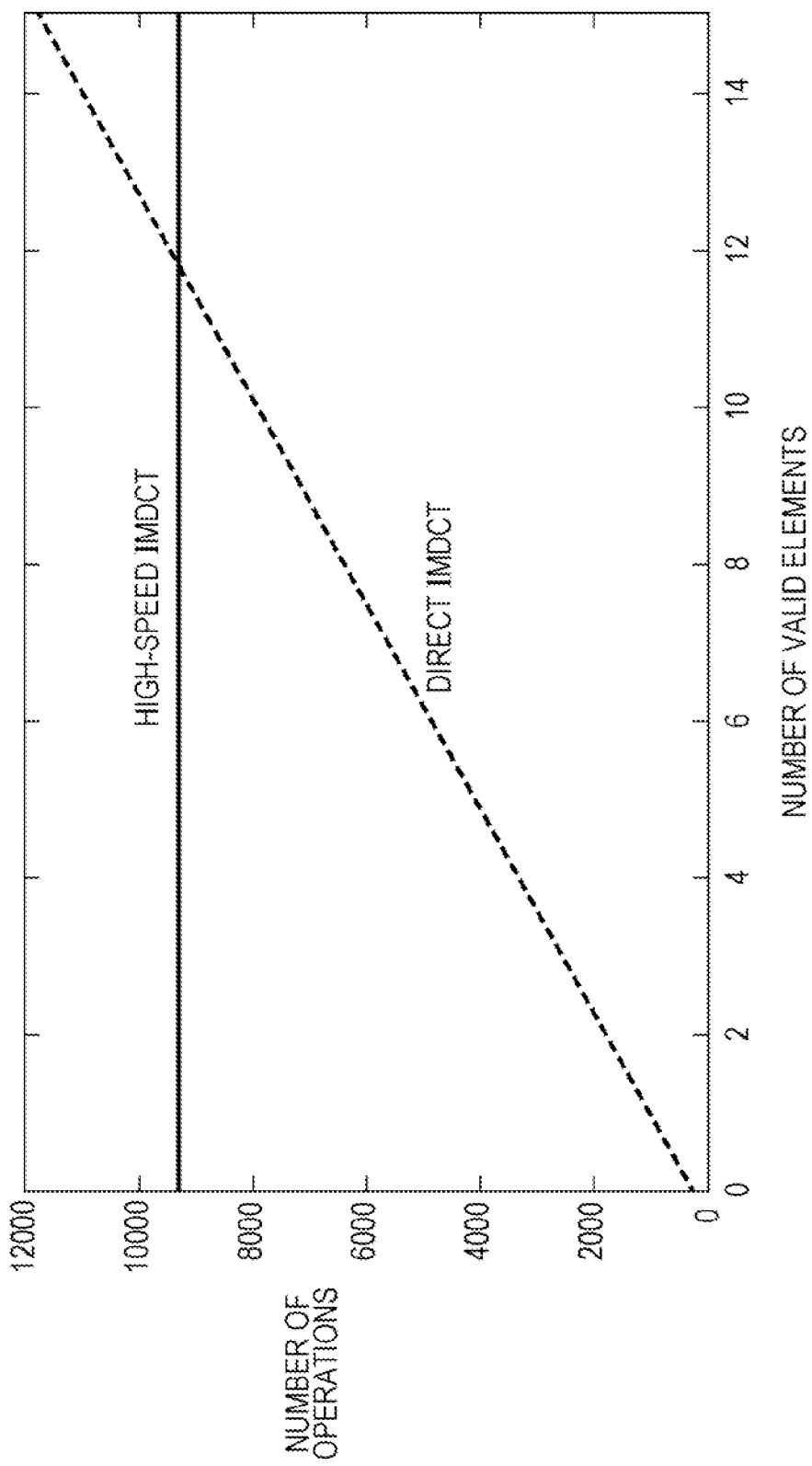
FIG. 5 is a graph showing the operation numbers in DCT-IV in high-speed IMDCT and direct IMDCT.

FIG. 5 is a graph showing the number of operations in DCT-IV in the high-speed IMDCT when the number of band divisions is 256 and the number of operations in DCT-IV in the direct IMDCT.

In FIG. 5, the number of operations indicates the number obtained by adding the number of times of multiplication, the number of times of addition, the number of times of reading, and the number of times of evacuation. Further, in FIG. 5, the horizontal axis represents the number of valid elements in the matrix operation of DCT-IV, that is, the number M of valid spectra $X_N$, and the vertical axis represents the number of operations. Furthermore, in FIG. 5, a solid line denotes the number of operations in DCT-IV in the high-speed IMDCT and a dashed line denotes the number of operations in DCT-IV in the direct IMDCT.

According to the graph shown in FIG. 5, when M is equal to less than 11, the number of operations in DCT-IV in the direct IMDCT is lower than the number of operations in DCT-IV in the high-speed IMDCT. That is, when M is equal to or less than 11, the operation amount in performing the direct IMDCT with respect to a frequency signal is smaller than that in performing the high-speed IMDCT.

Thus, when M is sufficiently small, the operation amount in performing the direct IMDCT with respect to a frequency signal is smaller than that in performing the high-speed IMDCT. Accordingly, in the decoding device 10, the F/T converter 15 performs the high-speed IMDCT with respect to a common audio signal, and the F/T converter 16 performs the direct IMDCT with respect to a LFE signal of which M is sufficiently small. As a result, the operation amount of the frequency-time transform can be reduced and the power consumption can be reduced.

[Description of Processing of Decoding Device]

Figure 6:
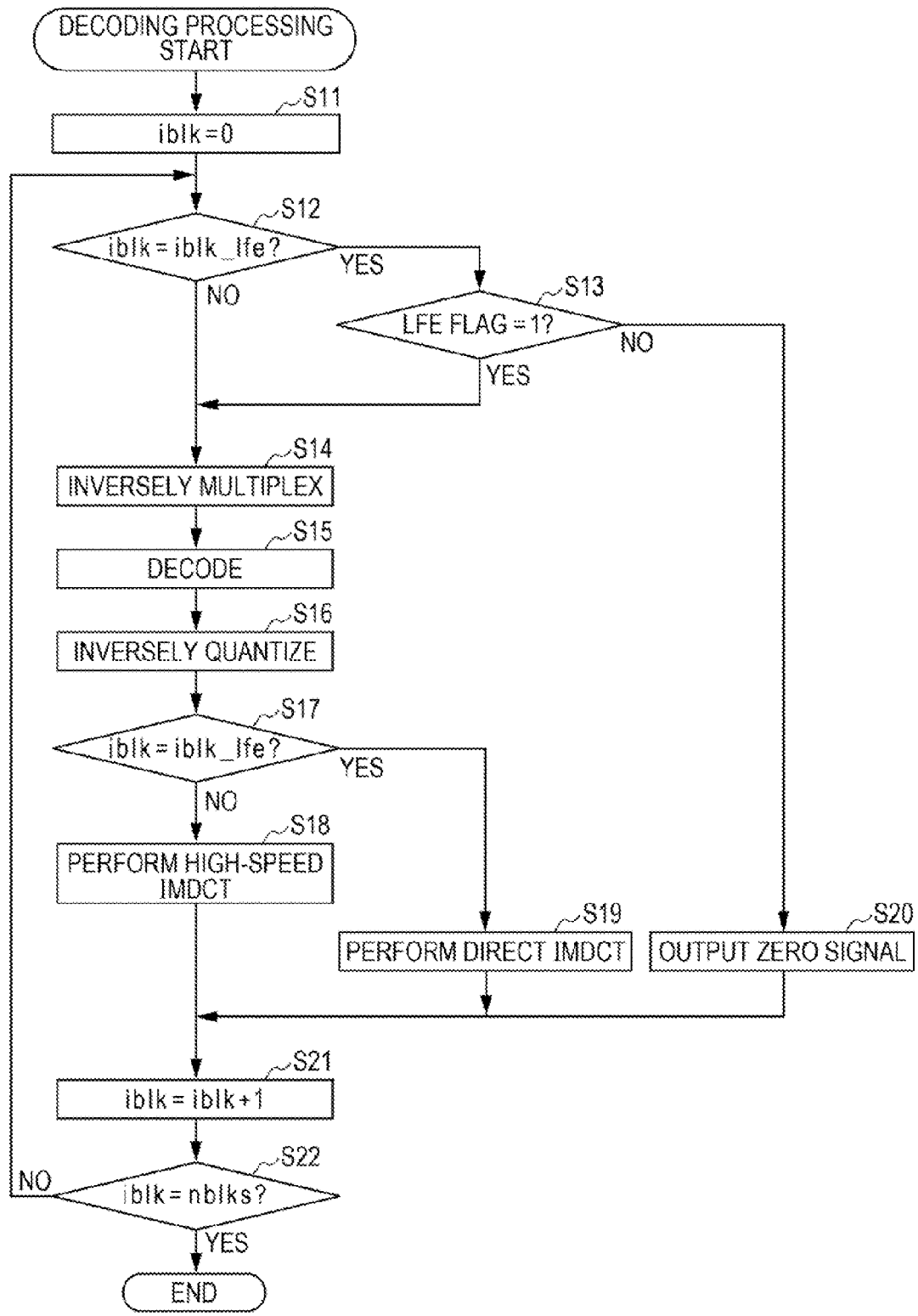
FIG. 6 is a flowchart of decoding processing performed by the decoding device of FIG. 1.

FIG. 6 is a flowchart of decoding processing performed by the decoding device 10 of FIG. 1. The decoding processing is started when encoded data is inputted into the decoding device 10, for example.

In step S11, the controller 18 sets an objective block ID iblk, which is a block ID of an audio block which is an object of the processing, in the encoded data to be 0.

In step S12, the DEMUX 11 determines whether the objective block ID iblk is block ID iblk_lfe of the LFE, that is, whether the objective block ID iblk is 2. When it is determined that the objective block ID iblk is not the block ID iblk_lfe of the LFE in step S12, the processing goes to step S14.

On the other hand, when it is determined that the objective block ID iblk is the block ID iblk_lfe of the LFE in step S12, the controller 18 determines whether the LFE flag supplied from the DEMUX 11 is 1 in step S13. This LFE flag is obtained by inversely multiplexing the encoded data by the DEMUX 11.

When it is determined that the LFE flag is 1 in step S13, that is, when an encoding result of the LFE is included in the encoded data, the controller 18 instructs the output unit 17 to output a time signal from the F/T converter 16. Then, the processing goes to step S14.

In step S14, the DEMUX 11 inversely multiplexes the encoded data, extracts an audio block of the objective block ID iblk, and supplies the extracted audio block to the decoder 12.

In step S15, the decoder 12 decodes the audio block supplied from the DEMUX 11 and supplies the resulting frequency signal which is quantized to the inverse quantizer 13.

In step S16, the inverse quantizer 13 inversely quantizes the frequency signal which is quantized and is supplied from the decoder 12 and supplies the resulting frequency signal to the switch 14.

In step S17, the controller 18 determines whether the objective block ID iblk is the block ID iblk_lfe of the LFE. When it is determined that the objective block ID iblk is not the block ID iblk_lfe of the LFE in step S17, the controller 18 instructs the switch 14 to select the F/T converter 15. The switch 14 supplies the frequency signal supplied from the inverse quantizer 13, that is, a frequency signal corresponding to front LR, CENTER, or rear LR, to the F/T converter 15, in response to the instruction.

In step S18, the F/T converter 15 performs the high-speed IMDCT with respect to the frequency signal supplied from the switch 14 and outputs the resulting time signal via the output unit 17. Then, the processing goes to step S21.

On the other hand, when it is determined that the objective block ID iblk is the block ID iblk_lfe of the LFE in step S17, the controller 18 instructs the switch 14 to select the F/T converter 16. The switch 14 supplies the frequency signal supplied from the inverse quantizer 13, that is, the frequency signal of the LFE signal to the F/T converter 16 in response to the instruction.

In step S19, the F/T converter 16 performs the direct IMDCT with respect to the frequency signal of the LFE supplied from the switch 14 and outputs the resulting time signal via the output unit 17. Then, the processing goes to step S21.

On the other hand, when it is determined that the LFE flag is not 1 in step S13, that is, when the audio block of the LFE is not included in the encoded data, the controller 18 instructs the output unit 17 to output a zero signal. Then, the processing goes to step S20.

In step S20, the output unit 17 generates a zero signal in response to the instruction of the controller 18 and outputs the zero signal as the LFE signal. Then, the processing goes to step S21.

In step S21, the DEMUX 11 increments the objective block ID iblk by 1, and the processing goes to step S22.

In step S22, the DEMUX 11 determines whether the objective block ID iblk is a total number nblks of kinds of audio blocks, that is, whether the objective block ID iblk is 4. When it is determined that the objective block ID iblk is not the total number nblks in step S22, the processing returns to step S12 and processing of steps S12 to S22 is repeated until the objective block ID iblk becomes the total number nblks.

When it is determined that the objective block ID iblk is the total number nblks in step S22, that is, when all audio blocks are the object of the processing, the processing is ended.

Another Embodiment

[Configuration Example of Decoding Device According to Another Embodiment]

Figure 7:
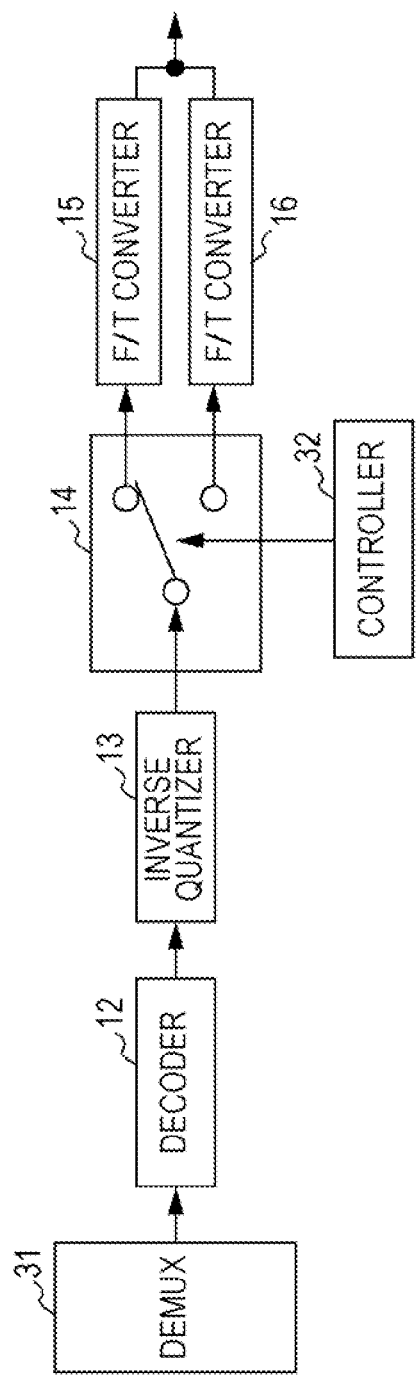
FIG. 7 is a block diagram showing a configuration example of a decoding device according to another embodiment of the present technology.

FIG. 7 is a block diagram showing a configuration example of a decoding device according another embodiment of the present technology.

In the configuration shown in FIG. 7, elements same as those of the configuration of FIG. 1 are given the same reference numerals. Redundant description is arbitrarily omitted.

A decoding device 30 shown in FIG. 7 has the configuration different from that of FIG. 1 in the way that the decoding device 30 includes a DEMUX 31 and a controller 32 instead respectively of the DEMUX 11 and the controller 18 and does not include the output unit 17. The decoding device 30 decodes encoded data which does not include a LFE flag but constantly includes an encoding result of LFE.

Specifically, in the decoding device 30, the DEMUX 31 acquires encoded data and inversely multiplexes the encoded data. Accordingly, the DEMUX 31 extracts audio blocks of front LR, CENTER, and rear LR which are frequency signals of a common audio signal which is quantized and encoded and supplies the audio blocks to the decoder 12. Further, the DEMUX 31 extracts an audio block of LFE which is a frequency signal of a LFE signal which is quantized and encoded and supplies the audio block to the decoder 12.

The controller 32 instructs the switch 14 to select either F/T converter 15 or the F/T converter 16 based on a decoding object.

[Configuration Example of Coded Data]

Figure 8:
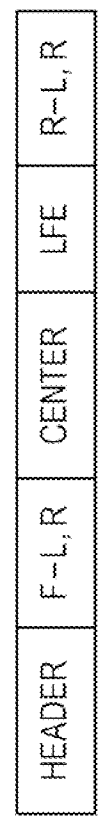
FIG. 8 illustrates a configuration example of encoded data transmitted to the decoding device of FIG. 7.

FIG. 8 illustrates a configuration example of the encoded data transmitted to the decoding device 30 of FIG. 7.

In the encoded data of FIG. 8, a header, front LR, CENTER, LFE, and rear LR are arranged from the head in this order. In the encoded data of FIG. 8, the audio block of the LFE is constantly arranged, being different from the encoded data of FIG. 2. Accordingly, a LFE flag is not arranged in the encoded data of FIG. 8.

[Description of Processing of Decoding Device]

Figure 9:
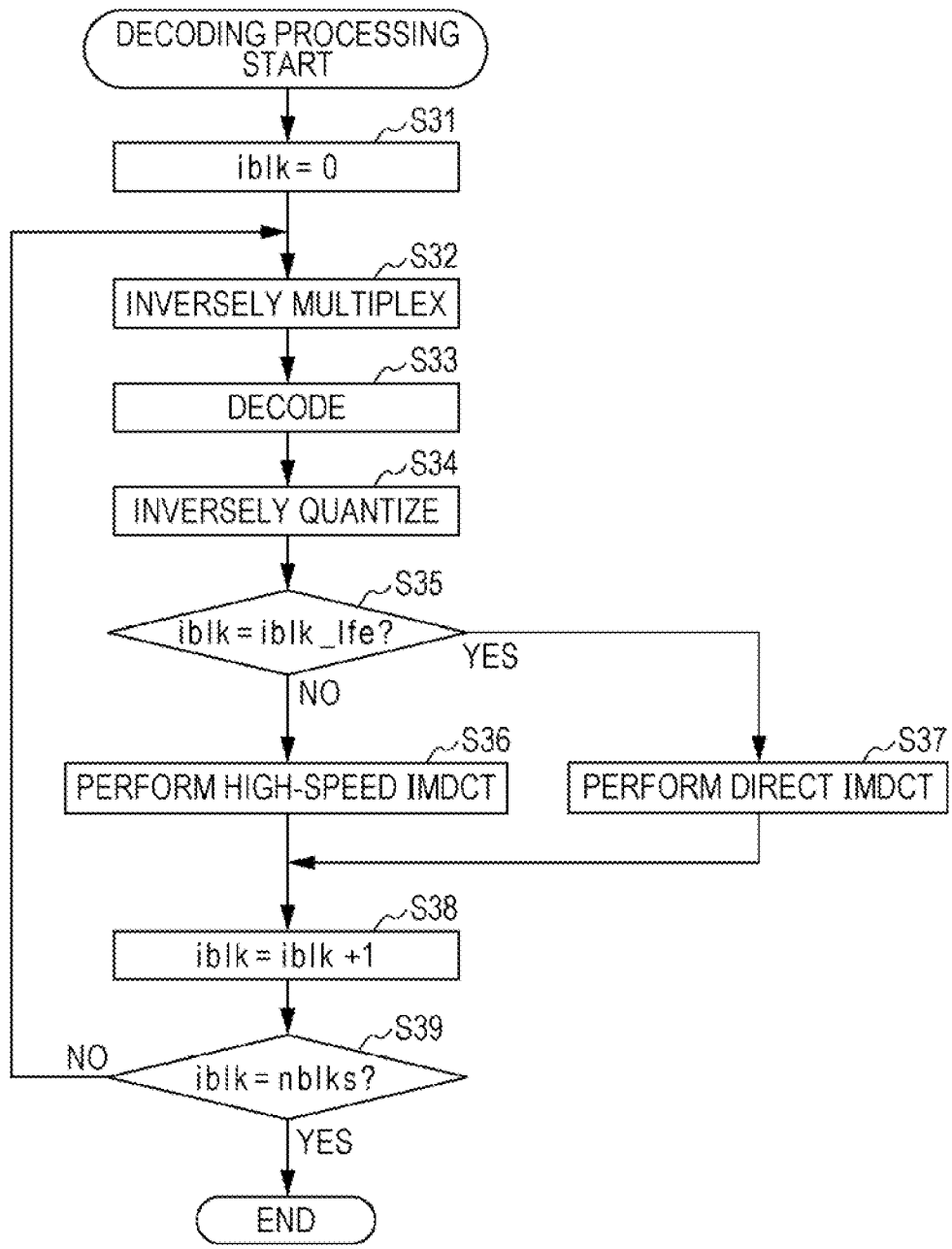
FIG. 9 is a flowchart of decoding processing performed by the decoding device of FIG. 7.

FIG. 9 is a flowchart of decoding processing performed by the decoding device 30 of FIG. 7. This decoding processing is started when encoded data is inputted into the decoding device 30, for example.

The decoding processing of FIG. 9 is processing which does not include steps S12, S13, and S20 of the decoding processing of FIG. 6. That is, processing from step S31 to step S39 of FIG. 9 are same as steps S11, S14 to S19, S21, and S22 of FIG. 6. Therefore, the description thereof is omitted.

Here, in the embodiments described first and second, a supply destination of the switch 14 is changed based on the block ID of a decoding object. However, the supply destination of the switch 14 may be changed based on an arrangement order of respective audio blocks in the encoded data. In this case, when LFE is included and the third audio block from the head of the encoded data is the decoding object, the F/T converter 16 is selected as the supply destination, and when other audio blocks are the decoding object, the F/T converter 15 is selected as the supply destination.

Still Another Embodiment

[Configuration Example of Decoding Device of Still Another Embodiment]

FIG. 10 is a block diagram showing a configuration example of a decoding device according to still another embodiment of the present technology.

A decoding device 50 of FIG. 10 includes a DEMUX 51, a decoder 52, an inverse quantizer 53, a switch 54, a F/T converter 55, a F/T converter 56, and a memory 57. The decoding device 50 decodes encoded data including actual data which is an encoding result of an original audio signal and concealment data which is an encoding result of a concealment signal which is used instead of the original audio signal when an error caused by a transmission channel or the like occurs in the actual data. Here, as the concealment signal, a signal of a band narrower than that of the original audio signal is used.

In the decoding device 50, the DEMUX 51 acquires encoded data and inversely multiples the encoded data. Accordingly, the DEMUX 51 extracts actual data and concealment data. Then, when no error occurs in inverse multiplexing, the DEMUX 51 supplies the actual data and the concealment data respectively to the decoder 52 and the memory 57. Further, the DEMUX 51 supplies an error flag showing whether an error occurs to the decoder 52 depending on presence/absence of an occurrence of an error in inverse multiplexing.

When the error flag from the DEMUX 51 shows that no error occurs, the decoder 52 decodes the actual data supplied from the DEMUR 51. When no error occurs in decoding, the decoder 52 supplies a frequency signal of an original audio signal which is quantized and obtained as a result of encoding to the inverse quantizer 53, and instructs the memory 57 to record the concealment data.

On the other hand, when the error flag from the DEMUX 51 shows that an error occurs, or when an error occurs in decoding the actual data, the decoder 52 reads out the concealment data from the memory 57. Then, the decoder 52 decodes the concealment data and supplies the resulting frequency signal of the concealment signal which is quantized to the inverse quantizer 53. Further, the decoder 52 supplies an error flag to the switch 54 based on the presence/absence of an error in decoding and the error flag supplied from the DEMUX 51.

The inverse quantizer 53 inversely quantizes the frequency signal of the original audio signal or the frequency signal of the concealment signal which are quantized and supplied from the decoder 52, and supplies the resulting frequency signal of the original audio signal or the concealment signal to the switch 54.

When an error flag showing no occurrence of an error is supplied from the decoder 52, the switch 54 supplies the frequency signal supplied from the inverse quantizer 53 to the F/T converter 55. That is, when the frequency signal of the original audio signal is supplied from the inverse quantizer 53, the frequency signal is supplied to the F/T converter 55.

On the other hand, when an error flag showing an occurrence of an error is supplied from the decoder 52, the switch 54 supplies the frequency signal supplied from the inverse quantizer 53 to the F/T converter 56. That is, when the frequency signal of the concealment signal is supplied from the inverse quantizer 53, the frequency signal is supplied to the F/T converter 56.

The F/T converter 55 performs high-speed IMDCT with respect to the frequency signal of the original audio signal which is supplied from the switch 54 so as to obtain the original audio signal which is a time signal and output the original audio signal.

The F/T converter 56 performs direct IMDCT with respect to the frequency signal of the concealment signal which is supplied from the switch 54 so as to obtain the concealment signal which is a time signal and output the concealment signal.

The memory 57 records the concealment data supplied from the DEMUX 51 in response to the instruction of the encoder 52.

[Configuration Example of Encoded Data]

FIG. 11 illustrates a configuration example of the encoded data transmitted to the decoding device 50 of FIG. 10.

In the encoded data of FIG. 11, a header, actual data, and concealment data of each frame are arranged from the head in this order. The concealment data of each frame is an encoding result of a frequency signal of a narrow band of actual data of the frame, for example. Actual data and concealment data included in the same encoded data correspond to different frames respectively. Specifically, encoded data of a certain frame includes actual data of the frame and concealment data of the following frame.

[Description of Using Method of Concealment Data]

FIG. 12 illustrates a using method of concealment data.

As shown in FIG. 12, encoded data [n−1] which is encoded data of the n−1th frame includes actual data [n−1] which is actual data of the n−1th frame and concealment data [n] which is concealment data of the nth frame.

In the same manner, encoded data [n] which is encoded data of the nth frame includes actual data [n] which is actual data of the nth frame and concealment data [n+1] which is concealment data of the n+1th frame. Encoded data [n+1] which is encoded data of the n+1th frame includes actual data [n+1] which is actual data of the n+1th frame and concealment data [n+2] which is concealment data of the n+2th frame.

Here, when no error occurs in the encoded data of the n−1th frame and an error occurs in the encoded data of the nth frame, the decoder 52 decodes the concealment data [n] which is included in the encoded data of the n−1th frame, which is one frame before the encoded data of the nth frame, instead of the actual data [n]. As a result, loss and damage of the actual data can be concealed and sound interruption can be prevented.

Further, actual data and concealment data of different frames are included in the same encoded data, so that simultaneous loss of actual data and concealment data of the same frame can be prevented.

[Description of Processing of Decoding Device]

Figure 13:
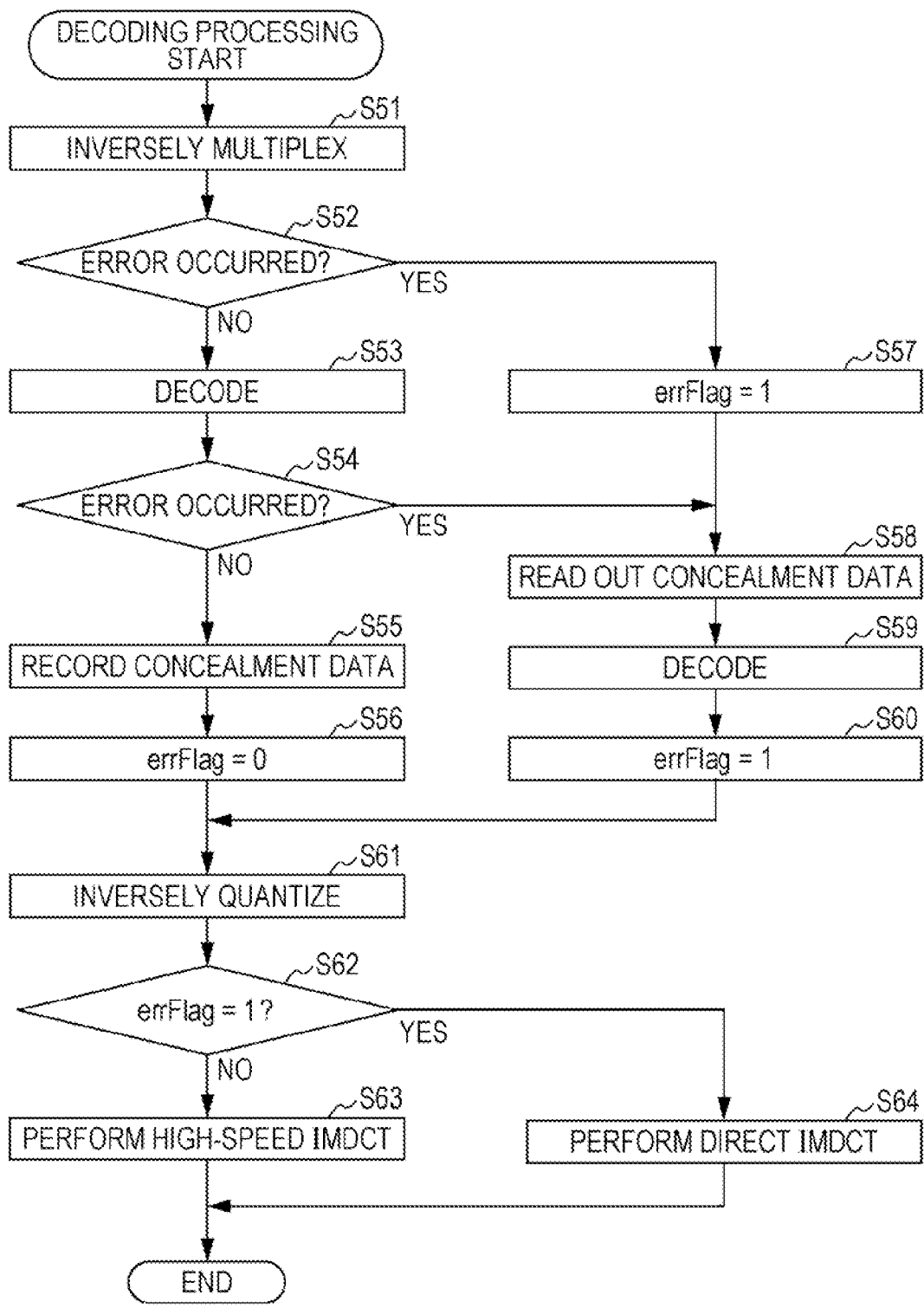
FIG. 13 is a flowchart of decoding processing performed by the decoding device of FIG. 10.

FIG. 13 is a flowchart of decoding processing performed by the decoding device 50 of FIG. 10. The decoding processing is started when encoded data is inputted into the decoding device 50, for example.

In step S51, the DEMUX 51 inversely multiplexes the encoded data. Accordingly, the DEMUX 51 extracts actual data and concealment data.

In step S52, the DEMUX 51 determines whether an error occurs in inverse multiplexing. When it is determined that no error occurs in inverse multiplexing in step S52, the decoder 52 decodes actual data supplied from the DEMUX 51 in step S53.

In step S54, the decoder 52 determines whether an error occurs in decoding. When it is determined that no error occurs in decoding in step S54, the decoder 52 instructs the memory 57 to record the concealment data.

In step S55, the memory 57 records the concealment data supplied from the DEMUX 51 in response to the instruction of the decoder 52.

In step S56, the decoder 52 sets an error flag (errFlag) to be 0 which expresses no occurrence of an error and supplies the error flag to the switch 54. Then, the processing goes to step S61.

On the other hand, when it is determined that an error occurs in inverse multiplexing in step S52, the DEMUX 51 sets the error flag to be 1 which expresses an occurrence of an error and supplies the error flag to the decoder 52 in step S57. Then, the processing goes to step S58.

Further, when it is determined that an error occurs in decoding in step S54, the processing goes to step S58.

In step S58, the decoder 52 reads out the concealment data from the memory 57. In step S59, the decoder 52 decodes the concealment data read out from the memory 57 and supplies the frequency signal of the concealment signal which is quantized to the inverse quantizer 53.

In step S60, the decoder 52 sets the error flag to be 1 and supplies the error flag to the switch 54. Then, the processing goes to step S61.

Step S61, the inverse quantizer 53 inversely quantizes a frequency signal of an original audio signal or a frequency signal of the concealment signal which are quantized and supplied from the decoder 52 and supplies the resulting frequency signal of the original audio signal or the resulting frequency signal of the concealment signal to the switch 54.

In step S62, the switch 54 determines whether the error flag supplied from the decoder 52 is 1. When it is determined that the error flag is not 1 in step S62, that is, when the error flag is 0, the switch 54 supplies the frequency signal of the original audio signal which is the frequency signal supplied from the inverse quantizer 53 to the F/T converter 55. Then, the processing goes to step S63.

In step S63, the F/T converter 55 performs high-speed IMDCT with respect to the frequency signal of the original audio signal which is supplied from the switch 54 and outputs the resulting time signal. Then, the processing is ended.

On the other hand, when it is determined that the error flag is 1 in step S62, that is, when an error occurs in at least one of the DEMUX 51 and the decoder 52, the switch 54 supplies the frequency signal of the concealment signal which is the frequency signal supplied from the inverse quantizer 53 to the F/T converter 56.

Then, in step S64, the F/T converter 56 performs direct IMDCT with respect to the frequency signal of the concealment signal supplied from the switch 54 and outputs the resulting time signal. Then, the processing is ended.

Yet Another Embodiment

[Description of Computer to which Embodiments of the Present Technology are Applied]

The series of the processing described above may be performed either by hardware or software. In a case where the series of processing is performed by software, a program constituting the software is installed into a general-purpose computer or the like.

FIG. 14 illustrates a configuration example of an embodiment of a computer on which a program which performs the above-described series of processing is installed.

The program can be preliminarily stored in a storage unit 208 or a read only memory (ROM) 202 which serves as a storage medium built in the computer.

Alternatively, the program can be stored (recorded) in a removable medium 211. Such the removable medium 211 can be provided as so-called packaged software. Here, examples of the removable medium 211 include a flexible disc, a compact disc read only memory (CD-ROM), a magneto optical (MO) disc, a digital versatile disc (DVD), a magnetic disc, and a semiconductor memory.

The program can be installed on the computer from the removable medium 211 described above through a drive 210, or the program can be downloaded into the computer through a communication network or a broadcast network so as to be installed on the storage unit 208 which is built in. That is, the program can be wirelessly transferred to the computer from a download site through a satellite for digital satellite broadcast or can be transferred in a wired fashion through a network such as a local area network (LAN) and an internet, for example.

The computer includes a central processing unit (CPU) 201 built in, and an input-output interface 205 is connected to the CPU 201 through a bus 204.

When an input unit 206 is operated, for example, by a user and thus a command is inputted into the CPU 201 through the input-output interface 205, the CPU 201 executes the program stored in the ROM 202 in accordance with the command. Alternatively, the CPU 201 loads the program stored in the storage unit 208 into a random access memory (RAM) 203 so as to execute the program.

Accordingly, the CPU 201 performs processing following the above-described flowchart or processing performed by the structure of the above-described block diagram. Then, the CPU 201, for example, outputs the processing result from an output unit 207, transmits the processing result from a communication unit 209, or allows the storage unit 208 to store the processing result through the input-output interface 205, as necessary.

The input unit 206 is a key board, a mouse, a microphone, or the like. The output unit 207 is a liquid crystal display (LCD), a speaker, or the like.

In this specification, the processing performed by the computer in accordance with the program is not necessarily performed in a time-series manner following the order described as the flowchart. That is, the processing performed by the computer in accordance with the program includes processing performed in a parallel manner or in an individual manner (for example, parallel processing or processing by an object), as well.

The program may be processed by a single computer (processor) or may be processed in a distributed manner by a plurality of computers. Further, the program may be transferred to a remote computer and be performed.

The embodiments of the present technology are applicable not only to a decoding device which performs IMDCT as frequency-time transform but also to a decoding device which performs other inverse orthogonal transform such as IFFT and IDCT.

Further, the embodiments of the present technology are applicable to a decoding device which decodes encoded data of a signal other than an audio signal.

It should be understood that embodiments of the present technology are not limited to the embodiments described above and various alterations may occur within the scope of the present technology.

The present disclosure contains subject matter related to that disclosed in Japanese Priority Patent Application JP 2010-173943 filed in the Japan Patent Office on Aug. 2, 2010, the entire contents of which are hereby incorporated by reference.

What is claimed is:

1. A decoding device, comprising:
   an acquisition unit configured to acquire a first frequency signal including a narrowband signal and a wideband signal;
   a direct inverse orthogonal transform unit configured to perform a direct matrix operation with respect to the narrowband signal of the first frequency signal so as to perform inverse orthogonal transform; and
   a high-speed inverse orthogonal transform unit configured to perform inverse orthogonal transform employing a high-speed operation method with respect to the wideband signal of the first frequency signal.

2. The decoding device according to claim 1, further comprising:
   a selecting unit that selects the narrowband signal of the first frequency signal so as to supply the narrowband signal to the direct inverse orthogonal transform unit and selects the wideband signal so as to supply the wideband signal to the high-speed inverse orthogonal transform unit; wherein
   information expressing being the narrowband signal is added to the narrowband signal and information expressing being the wideband signal is added to the wideband signal, and
   the selecting unit selects the narrowband signal and the wideband signal based on the information.

3. The decoding device according to claim 1, further comprising:
a selecting unit that selects the narrowband signal of the first frequency signal so as to supply the narrowband signal to the direct inverse orthogonal transform unit and selects the wideband signal so as to supply the wideband signal to the high-speed inverse orthogonal transform unit; wherein
the narrowband signal and the wideband signal are arranged in a predetermined order in the first frequency signal, and
the selecting unit selects the narrowband signal and the wideband signal based on the order in the first frequency signal.

4. The decoding device according to claim 1, further comprising:
an output unit configured to generate a zero signal and output the zero signal; wherein
the acquisition unit further acquires a second frequency signal that includes no narrowband signal but includes the wideband signal, and
the output unit outputs the zero signal as a result of inverse orthogonal transform of the narrowband signal of the second frequency signal.

5. The decoding device according to claim 4, wherein
information expressing inclusion of the narrowband signal is added to the first frequency signal,
information expressing no inclusion of the narrowband signal is added to the second frequency signal, and
the output unit outputs the zero signal as a result of inverse orthogonal transform of the narrowband signal of the second frequency signal based on the information.

6. The decoding device according to claim 1, wherein
the narrowband signal is a low frequency effect signal, and
the wideband signal is a wideband audio signal.

7. The decoding device according to claim 1, wherein the narrowband signal is a concealment signal that is used when an error occurs in the wideband signal.

8. The decoding device according to claim 7, wherein
when an error occurs in the wideband signal, the direct inverse orthogonal transform unit performs the direct matrix operation with respect to the narrowband signal so as to perform the inverse orthogonal transform, and outputs a resulting time signal as a time signal of the wideband signal, and
when no error occurs in the wideband signal, the high-speed inverse orthogonal transform unit performs the inverse orthogonal transform employing the high-speed operation method with respect to the wideband signal and outputs the resulting signal.

9. The decoding device according to claim 1, wherein the inverse orthogonal transform performed by the direct inverse orthogonal transform unit includes a product sum operation of a spectrum in a valid band of the narrowband signal and a predetermined coefficient.

10. A decoding method that is employed by a decoding device, comprising:
performing a direct matrix operation with respect to a narrowband signal of a frequency signal that includes the narrowband signal and a wideband signal so as to perform inverse orthogonal transform; and
performing inverse orthogonal transform employing a high-speed operation method with respect to the wideband signal of the frequency signal.

11. A non-transitory computer-readable medium storing a program which, when executed by a computer, causes the computer to perform processing comprising:
performing a direct matrix operation with respect to a narrowband signal of a frequency signal that includes the narrowband signal and a wideband signal so as to perform inverse orthogonal transform; and
performing inverse orthogonal transform employing a high-speed operation method with respect to the wideband signal of the frequency signal.

* * * * *